(12) United States Patent
Ohmi et al.

(10) Patent No.: US 6,314,992 B1
(45) Date of Patent: Nov. 13, 2001

(54) FLUID-SWITCHABLE FLOW RATE CONTROL SYSTEM

(75) Inventors: Tadahiro Ohmi, 1-17-301 Komegahukuro 2-chome, Aoba-ku, Miyagi 980-0813; Satoshi Kagatsume; Jun Hirose, both of Yamanashi; Kouji Nishino, Osaka, all of (JP)

(73) Assignees: Fujikin Incorporated, Osaka; Tadahiro Ohmi, Miyagi; Tokyo Electron Ltd., Tokyo, all of (JP)

( * ) Notice: Subject to any disclaimer, the term of this patent is extended or adjusted under 35 U.S.C. 154(b) by 0 days.

(21) Appl. No.: 09/530,022
(22) PCT Filed: Aug. 9, 1999
(86) PCT No.: PCT/JP99/04311
§ 371 Date: Apr. 24, 2000
§ 102(e) Date: Apr. 24, 2000
(87) PCT Pub. No.: WO00/11532
PCT Pub. Date: Mar. 2, 2000

(30) Foreign Application Priority Data

Aug. 24, 1998 (JP) .................................................. 10-236656

(51) Int. Cl.[7] ...................................................... G05D 7/06
(52) U.S. Cl. ........................................ 137/486; 137/487.5
(58) Field of Search .................................. 137/486, 487.5

(56) References Cited

U.S. PATENT DOCUMENTS 6,178,995 * 1/2001 Ohmi et al. .................... 137/487.5 X

* cited by examiner

*Primary Examiner*—Gerald A. Michalsky
(74) *Attorney, Agent, or Firm*—Griffin & Szipl, P.C.

(57) ABSTRACT

A fluid-switchable flow rate control system that permits free changing of the full scale flow rate and which can control a plurality of kinds of fluids with high precision. The fluid-switchable flow rate control system controls the flow rate of fluid with the pressure $P_1$ on the upstream side of the orifice member held about twice or more higher than the downstream pressure $P_2$, the fluid-switchable flow rate control system comprising an orifice member 8 replaceable with another to provide a suitable orifice diameter according to the kind of fluid and the flow rate range, a control valve 2 provided on the upstream side thereof, a pressure detector 6 provided between the control valve 2 and the orifice member 8, a flow rate calculation circuit 14 where from the pressure $P_1$ detected by the pressure detector, the flow rate Qc is calculated with the equation $Qc=KP_1$ (K=constant), a flow rate-setting circuit 16 for outputting flow rate setting signal Qe, a flow rate conversion circuit 18 for multiplying the calculated flow rate signal Qc by the flow rate conversion rate k into switch-over calculated flow rate signal Qf (Qf= kQc) to change the full scale flow rate, and a calculation control circuit 20 to output the difference between the switch-over calculation flow rate signal Qf and the flow rate setting signal Qe as control signal Qy to the drive 4 of the control valve 2, thereby opening or closing the control valve to bring the control signal Qy to zero, thus controlling the flow rate on the downstream side of the orifice member.

6 Claims, 7 Drawing Sheets

FLUID-SWITCHABLE FLOW RATE CONTROL SYSTEM

BACKGROUND OF THE INVENTION

1. Field of the Invention

The present invention relates to a flow rate control apparatus adaptable for a variety of fluids, such as gases, for use in the manufacture of such products as semiconductors, chemicals, and precision machine parts. More specifically, the present invention relates to a fluid-switchable flow rate control system that permits high-precision control of the flow rates of a variety of fluids with the use of a single orifice over specific ranges of flow rate. The orifice mounted in the present fluid-switchable flow rate control system is replaceable, so that the type of fluid and the flow rate range can be widely varied.

2. Description of the Prior Art

Mass flow rate controllers have been widely used in fluid supply systems for such manufacturing facilities as for semiconductors and chemical products.

FIG. 7 shows an example of a high-purity moisture generator for use in semiconductor manufacturing facilities. Three kinds of gases—$H_2$ gas, $O_2$ gas and $N_2$ gas—are introduced into a reactor RR through valves $V_1$ to $V_3$, with the flow rates regulated by mass flow rate controllers MFC 1 to MFC 3. That is, first, valve $V_3$ is opened with valves $V_1$ and $V_2$ kept closed, and the reactor RR is purged with $N_2$ gas. Then, valve $V_3$ is closed and valves $V_1$ and $V_2$ are opened to feed $H_2$ gas and $O_2$ gas to the reactor RR at specific flow rates. In the reactor RR, $H_2$ gas and $O_2$ gas are allowed to react into $H_2O$ with platinum serving as catalyst without combustion. The high-purity water vapor thus produced is supplied to production facilities (not shown).

Mass flow rate controllers each have undergone linear correction and adjustment for a specific gas and flow range, and cannot be used for gases other than that for which the mass flow rate controllers are adjusted. Therefore, the mass flow rate controllers MFC1 to MFC3 are installed for $H_2$ gas, $O_2$ gas and $N_2$ gas respectively, that is, one particular mass flow rate controller for one particular gas as shown in FIG. 7. Another problem is that even with the same gas, the mass flow rate controller itself will have to be replaced when the flow range, that is, the full scale flow rate is to be changed.

For a gas supply system as shown in FIG. 7, replacement is stocked for mass flow rate controllers MFC1 to MFC 3. Those mass flow rate controllers themselves are expensive and so are their replacement parts. That boosts equipment costs and running costs.

Linearity correction and adjustment takes a long time. If the linearity correction and adjustment is effected for a new gas each time types of gases and flow ranges are changed instead of replacing the mass flow rate controller, the production plant has to be temporarily shut down. For this reason, it is necessary to have spare mass flow rate controllers in stock at all times.

SUMMARY OF THE INVENTION

The fluid-switchable flow rate control system according to the present invention addresses those problems with the mass flow rate controller. The present invention provides a flow rate control system which controls the flow rate of fluid with the pressure $P_1$ on the upstream side of the orifice held about twice or more higher than the downstream pressure $P_2$, the fluid-switchable flow rate control system comprising an orifice member replaceable with another to provide a suitable orifice diameter according to the kind of fluid and the flow rate range, a control valve provided on the upstream thereof, a pressure detector provided between the control valve and the orifice member, and a flow rate calculation circuit where from the pressure $P_1$ detected by the pressure detector, the flow rate Qc is calculated with the equation $Qc=KP_1$ (K:constant), a flow rate-setting circuit for outputting flow rate setting signal Qe, a flow rate conversion circuit for converting the calculated flow rate signal Qc into calculated switch-over flow rate signal Qf to change the full scale flow rate and a calculation control circuit to output the difference between that calculated switch-over flow rate signal Qf and the flow rate setting signal Qe as control signal Qy to the drive for the control valve, thereby opening or closing the control valve to bring the control signal Qy to zero, thus controlling the flow rate on the downstream side of the orifice member.

The invention provides a flow rate control system as described above wherein the flow rate conversion circuit is configured so that the calculated flow rate Qc is multiplied by conversion rate k into the calculated switch-over flow rate signal (Qf(Qf=kQc).

The invention also provides a flow rate control system wherein the flow rate conversion circuit regulates the amplification rate of an output amplifier of the pressure detector.

The present invention provides a flow rate control syustem as defined above wherein the flow rate conversion circuit is a DIP switch or dual in-line switch.

The invention provides a fluid-switchable flow rate control system which controls the flow rate of fluid with the pressure $P_1$ on the upstream side of the orifice held about twice or more higher than the downstream pressure $P_2$, the fluid-switchable flow rate control system comprising an orifice member replaceable with another to provide a suitable orifice diameter according to the kind of fluid and the flow rate range, a control valve provided on the upstream thereof, a pressure detector provided between the control valve and the orifice member, and a flow rate calculation circuit where from the pressure $P_1$ detected by the pressure detector, the flow rate Qc is calculated with the equation $Qc=KP_1$ (K=constant), a flow rate-setting circuit for outputting flow rate setting signal Qe, a flow rate conversion circuit for converting the flow rate setting signal Qe into flow rate specifying signal Qs to change the full scale flow rate and a calculation control circuit to output the difference between the flow rate specifying signal Qs and the calculated flow rate Qc as control signal Qy to the drive for the control valve, thereby opening or closing the control valve to bring the control signal Qy to zero, thus controlling the flow rate on the downstream side of the orifice member.

The invention provides a flow rate control system as wherein the flow rate conversion circuit is so configured that the flow rate setting signal Qe is multiplied by the flow rate conversion rate k into the flow specifying rate signal Qs (Qs=kQc).

Figure 1:
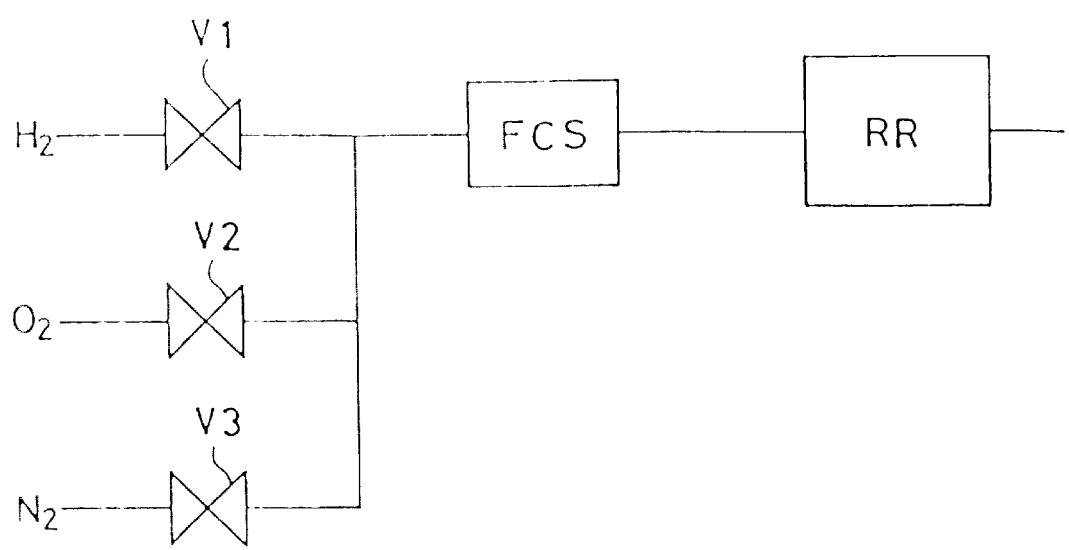
FIG. 1 shows one of the application examples of the fluid-switchable flow rate control system FCS embodying the present invention where a plurality of fluids are fed through one fluid-switchable flow rate control system FCS.

LIST OF REFERENCE NUMERALS 2, 2a, 2b, 2c control valve
2d diaphragm press
2e diaphragm
2f valve seat
3 upstream fluid passage
4, 4a, 4b, 4c drive unit
5 downstream fluid passage
6 pressure detector
8 orifice member
8a orifice bore
8b orifice holder
8c, 8d flange
10 orifice-adapted valve
12 joint for taking out gas
14 flow rate calculation circuit
16 flow rate setting circuit
18 flow rate conversion circuit
20 calculation control circuit
22, 24 amplifier
23 temperature detector
26, 28 A/D converter
30 temperature compensation circuit
32 calculation circuit
34 comparison circuit
36 amplifier circuit
FCS fluid-switchable flow rate control system
Qc calculated flow rate signal
Qf calculated switch-over flow rate signal
Qe flow rate setting signal
Qs flow rate specifying signal
k flow rate conversion rate

DESCRIPTION OF THE PREFERRED EMBODIMENTS

It has been known that the flow velocity of a gas passing through a nozzle reaches sonic velocity if the ratio $P_2/P_1$ of the gas pressure upstream of the nozzle to that downstream thereof (where $P_1$=pressure on the upstream side; $P_2$=pressure on the downstream side) falls below the critical pressure ratio of the gas (in the case of air, nitrogen etc., about 0.5). In such state, a change in pressure on the downstream side of the nozzle will no longer be propagated to the upstream side, and thus it will be possible to obtain a stable mass flow rate corresponding to the state on the upstream side of the nozzle.

Thus, the inventors of the present invention disclosed in a Japanese patent application laid open unexamined under 08-338546 that if an orifice is used in place of a nozzle, in the event of a fixed tiny orifice diameter, the flow rate of the gas passing through the orifice will be proportional only with the pressure $P_1$ on the upstream side of the orifice, with a very high precision linearity established.

In other words, in the event that the gas is air, nitrogen, or the like, the flow rate Qc of the gas passing through the orifice is obtained with the equation: $Qc=KP_1$ (K=constant) with the upstream pressure $P_1$ set twice or more higher than the downstream pressure $P_2$. The constant K depends on the orifice diameter only. That offers an advantage that when a new orifice is installed, the procedural change that has to be made is to change the constant K only.

It is also noted that the use of an orifice in the present invention facilitates switchover of the full-scale flow rate. The flow rate setting signal Qe is given in a voltage value, and if, for example, a pressure range from 0 to 3 $kgf/cm^2abs$ is expressed in a voltage range from 0 to 5 volts, the full-scale value 5 volts corresponds to 3 $kgf/cm^2abs$. Here let it be supposed that the flow rate conversion rate k in the flow rate conversion circuit is set at 1. That is, in the embodiment shown in FIG. 2, if 5 volts is input as the flow rate setting signal Qe, the switch-over calculated flow rate signal Qf (Qf=kQc) will be 5 volts and the control valve will be so regulated to bring the pressure $P_1$ on the upstream side to 3 $kgf/cm^2abs$.

Figure 3:
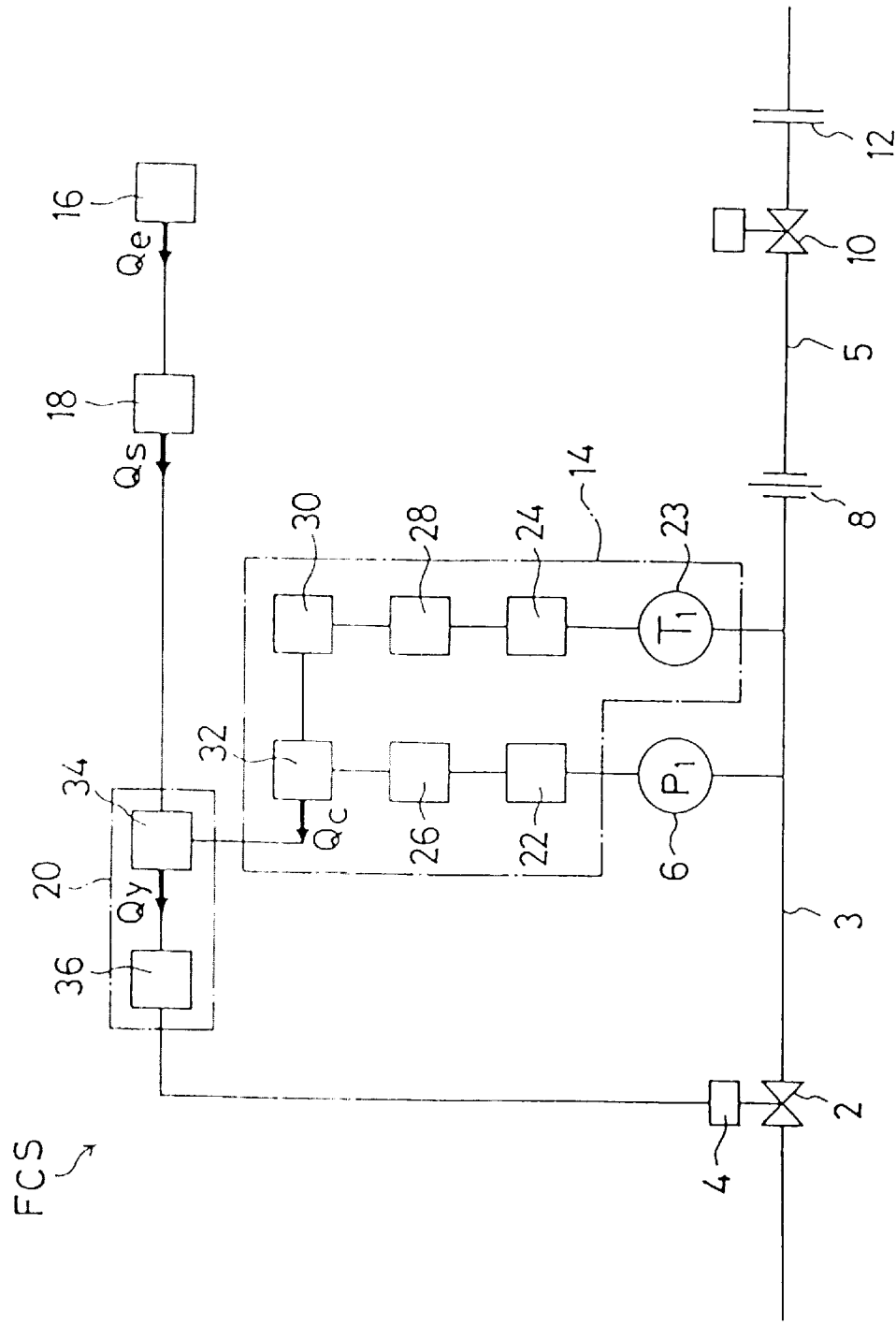
FIG. 3 is a block diagram of the fluid-switchable flow rate control system of a second embodiment.

In the embodiment shown in FIG. 3, if 5 volts is input as the flow rate setting signal Qe, the flow rate specifying signal Qs will also be 5 volts because Qs=kQe and the control valve will be so regulated that the pressure $P_1$ on the upstream side is 3 $kgf/cm^2abs$.

Next, there will be described an example where the pressure range is switched over to 0 to 2 $kgf/cm^2abs$ and this pressure range is expressed in a flow rate setting signal Qe of 0 to 5 volts. That is, the full scale value of 5 volts gives 2 $kgf/cm^2abs$. In this case, the flow rate conversion rate k will be set at 2/3. If, for example, a flow rate setting signal Qe of 5 volts is input in FIG. 1, the switch-over calculated flow rate signal Qf will be 5×2/3 volts because Qf=kQc. Similarly, in FIG. 3, the flow rate specifying signal Qs will be 5×2/3 volts because Qs=kQe, and the control valve will be so operated that the upstream pressure $P_1$ is 3×2/3=2 $kgf/cm^2abs$. In other words, a full-scale flow rate switchover will be so effected that Qe=5 volts expresses the flow rate of $P_1$=2 $kgf/cm^2abs$.

Another advantage of the present invention is that one orifice can control the flow rates of a plurality of kinds of gases. With the orifice of the same orifice diameter, the flow rate Qc is given with the equation $Qc=KP_1$ where the constant K is fixed.

That is, it is known that while the orifice diameter and the constant K are proportional to each other, the constant K differs depending upon the type of gas. Herein, the constants for $H_2$ gas, $O_2$ gas and $N_2$ gas will be indicated in KH, KO and KN respectively. The constant K is usually expressed in a flow factor FF in which nitrogen gas serves as the standard. If the flow factors FFs for $H_2$ gas, $O_2$ gas, and $N_2$ gas are represented by FFH, FFO, and FFN, then FFH=KH/KN and FFO=KO/KN. Needless to say, FFN =KN/KN =1.

FIG. 1 shows one of the application examples of the fluid-switchable flow rate control system FCS embodying the present invention. One unit of the fluid-switchable flow rate control system FCS can control the flow rate of three kinds of gases—$H_2$ gas, $O_2$ gas, and $N_2$ gas. The flow rate conversion rate k given by the flow rate conversion circuit 18 in the fluid-switchable flow rate control system FCS is determined for each fluid on the basis of a definite relation involving the flow factor FF. This relation will be described in detail later. Here, the conversion rates for $H_2$ gas, $O_2$ gas and $N_2$ gas will be represented by kH, kO, and kN (=1).

First, valve $V_3$ is opened while valve $V_1$ and valve $V_2$ are kept closed to purge the reactor RR with $N_2$ gas. Because the flow rate conversion rate k for nitrogen or kN is 1, the switch-over calculated flow rate signal Qf will be almost equal to Qe because Qf=kQc (in the case of the FIG. 3 embodiment, the flow rate specifying signal Qs will be equal to Qe because Qs=kQe). The control valve will be opened or closed until that flow rate is reached.

In the next step, valve $V_1$ is opened while valve $V_2$ and valve $V_3$ are closed so that $H_2$ gas is fed to the reactor RR. Since the flow rate conversion rate k for $H_2$ gas is kH, the switch-over calculated flow rate signal Qf will be approximately equal to kH×Qe because Qf=kQc (in the case of the FIG. 3 embodiment, the flow rate specifying signal Qs will be equal to kH×Qe because Qs=kQc)—kH times as high as the flow rate setting signal Qe for $N_2$ gas. Thus, the control valve is so adjusted that the upstream pressure $P_1$ is kH times that for $N_2$ gas. The same process is followed when valve $V_2$ is opened to feed $O_2$ gas and the switch-over calculated flow rate signal Qf is set at a value close to kO×Qe (in the case of the invention in claim 5, the flow rate specifying signal Qs is set at kO×Qe) to regulate the control valve.

The application of the fluid-switchable flow rate control system FCS according to the present invention as shown in FIG. 1 is not practiced in practical semiconductor manufacturing plants yet. But, the method of supplying one kind of gas through valve $V_1$, valve $V_2$, and valve $V_3$ and one unit of FCS at greatly different flow rates is applied in practice.

EXAMPLES

Figure 2:
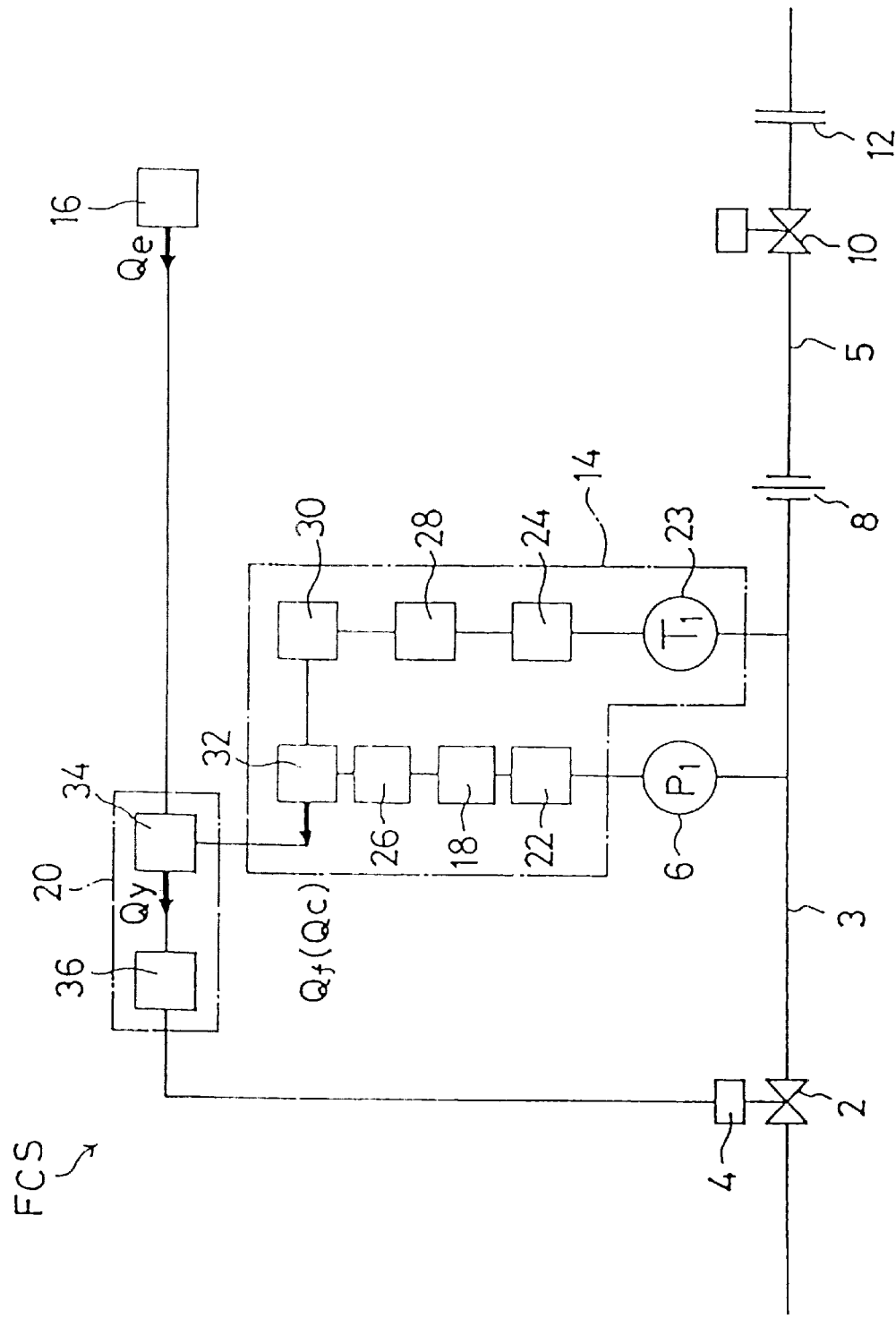
FIG. 2 is a block diagram of the fluid-switchable flow rate control system of a first embodiment.

FIG. 2 is a block diagram of a first embodiment of the fluid-switchable flow rate control system according to the present invention while FIG. 3 is a block diagram of a second embodiment of the fluid-switchable flow rate control system.

The fluid-switchable flow rate control system FCS comprises a control valve 2, a control valve drive 4, a pressure detector 6, an orifice member 8, an orifice-adapted valve 10, a joint for taking out gas 12, a flow rate calculation circuit 14, a flow rate setting circuit 16 and a calculation control circuit 20.

The flow rate calculation circuit 14 includes a temperature detector 23, amplifiers 22, 24, A/D converters 26, 28, a temperature compensation circuit 30 and a calculation circuit 32. The calculation control circuit 20 is formed from a comparison circuit 34 and an amplifier circuit 36.

The flow rate conversion circuit 18 is provided on the output side of the amplifier 22 of the pressure detector 6 in the flow rate calculation circuit 14 in the first embodiment (FIG. 2) and on the output side of the flow rate setting circuit 16 in the second embodiment (FIG. 3).

Control valve 2 includes a so-called direct-touch type metal diaphragm valve, which will be described later. Its control valve drive 4 is a piezoelectric type drive unit. The alternatives to this drive for the control valve 2 include the magnetostrictive type drive unit or solenoid type drive unit, motor-type drive unit, pneumatic type and thermal expansion drive unit.

The pressure detector 6 is of a semiconductor restrictive type. The alternatives to the pressure detector 6 include the metal foil restrictive pressure sensor, capacitance type sensor and magnetic resistance type pressure sensor.

The temperature detector 23 is a thermocouple type temperature sensor. In place of that, it is possible to use a variety of known temperature sensors such as the resistance bulb type temperature sensor.

The orifice member 8 used is a metal sheet gasket with a bore formed by cutting. Alternatives to this are an ultrathin pipe and a metal film with a bore formed by etching or electric discharge machining.

There will now be described the operation of the fluid-switchable flow rate control system FCS embodying the present invention with reference to FIG. 2 and FIG. 3.

Referring to FIG. 2, the upstream pressure $P_1$ of gas on the outlet side of the control valve 2, i.e. on the upstream side of the orifice 8 is detected by the pressure detector 6 and output to the amplifier 22, the flow rate conversion circuit 18, and then the A/D converter 26. Then, the digitized signals obtained are output to the calculation circuit 32.

Likewise, the gas temperature $T_1$ on the upstream side of the orifice is detected by the temperature detector 23 and the digitized signals are output to the temperature compensation circuit 30 through the amplifier 24 and the A/D converter 28.

If the flow rate conversion rate k of the flow rate conversion circuit 18 is, say, 1, that is, the full scale flow rate is not switched, then the flow rate Q is calculated with the equation $Q=KP_1$ on the basis of the upstream pressure $P_1$. At the same time, the flow rate Q is temperature-compensated by compensation signals from the temperature compensation circuit 30, and the calculated flow rate Qc is output to the comparison circuit 34.

In case the flow rate conversion rate k in the flow rate conversion circuit 18 is set at the constant K, then the switch-over calculated flow rate signal Qf output from the flow rate calculation circuit 14 to the calculation control circuit 20 will be k times as high as the calculated flow rate Qc, and the output signals of Qf=kQc will be input in the calculation control circuit 20.

It is noted that the constant k denotes a flow rate conversion rate and is used for changing the full scale flow rate. The flow rate conversion circuit 18 can change the flow rate conversion rate k continuously or in stages. For a change in stages, a DIP switch, for example, can be used.

In the second embodiment as shown in FIG. 3, meanwhile, the flow rate conversion circuit 18 is provided on the output side of the flow rate setting circuit 16. The flow rate setting signal Qe output from the flow rate setting circuit 16 is converted into flow rate specifying signal Qs (Qs=kQe) through the flow rate conversion circuit 18. And the flow rate specifying signal Qs is input into the calculation control circuit 20.

It is noted that in the second embodiment, the detected flow rate value, which is input into the calculation control circuit 20 from the flow rate calculation circuit 14, is the calculated flow rate Qc.

Figure 4:
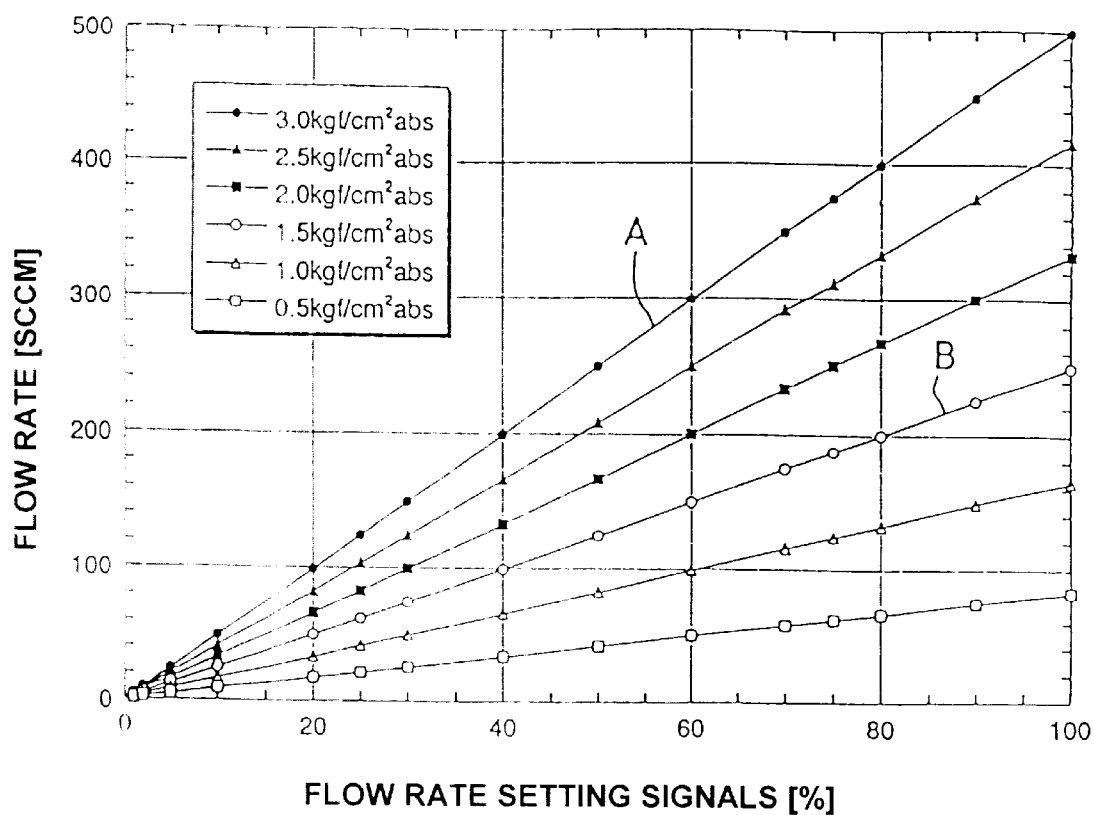
FIG. 4 shows the relation between flow rates and flow rate setting signals up to the full scale under different control pressures.

Now, the operation of the flow rate conversion circuit 18 will be described with reference with FIG. 4.

Let it be assumed that the flow rate setting signal Qe is a voltage value variable between 0 and 5 volts where 0 volts is represented by 0 percent and 5 volts by 100 percent. That is, 80 percent, for example, represents 4 volts. If the switch-over calculated flow rate signal Qf (or the flow rate specifying signal Qs) is 5 volts, the upstream pressure $P_1$ is brought to 3 kgf/cm²abs so that the flow rate is 500 SCCM.

With the flow rate conversion rate k=1, for example, corresponding to the 0 to 100 percent range of the flow rate setting signal Qe, the switch-over calculated flow rate signal Qf (or the flow rate specifying signal Qs) varies over a 0 to 100 percent range with Qf=kQc (or Qs=kQe) and indicates 0 to 500 SCCM in terms of the flow rate. According to this indication, the upstream pressure $P_1$ will be regulated between 0 and 3 kgf/cm²abs, which is represented by the line A marked with black circular dots. Next, with the flow rate conversion rate k=½, when the flow rate setting signal Qe is input in the range of 0 to 100 percent, the switch-over calculated flow rate signal Qf (or the flow rate specifying signal Qs) varies between 0 and 50 percent. That is, the flow rate is regulated between 0 and 250 SCCM as indicated by the line B marked with white circular dots. In this case, the varying range of the upstream pressure $P_1$ is between 0 and 1.5 kgf/cm²abs. That way, the full scale flow rate is switched from 500 SCCM to 250 SCCM.

In the comparison circuit 34, the comparison is made between the switch-over calculated flow rate signal Qf and the flow rate setting signal Qe (or the flow rate specifying signal Qs and the calculated flow rate Qc). And the difference Qy=Qf−Qe (or Qc−Qs) is output to the drive 4 for the control valve 2 through the amplifier circuit 36.

In case the switch-over calculated flow rate signal Qf is larger than the flow rate setting signal Qe (or the calculated flow rate Qc is larger than the flow rate specifying signal Qs), the control valve drive 4 will be actuated in the direction to close the control valve 2. If the reverse is the case, the control valve drive 4 will work to open the control valve 2. That way, the degree of opening of the control valve 2 is automatically regulated to achieve Qf=Qc (or Qc=Qs).

In the present invention, the following condition must always be met: $P_2/P_1$ be smaller than approximately 0.5, that is, $P_1>2P_2$ where $P_1$ is the pressure on the upstream side of the orifice member 8 and $P_2$ is the downstream pressure on the downstream side of the orifice member 8. Therefore, it may be so arranged that upstream pressure $P_1$ and the downstream pressure $P_2$ are both constantly monitored and input in an inversion amplifier (not shown). When the upstream pressure $P_1$ and the downstream pressure $P_2$ are reversed in amount resulting in a back flow state or $P_2/P_1$ is larger than 0.5 making it impossible to regulate the flow rate with precision, the control valve 2 will be automatically shut up.

Figure 5:
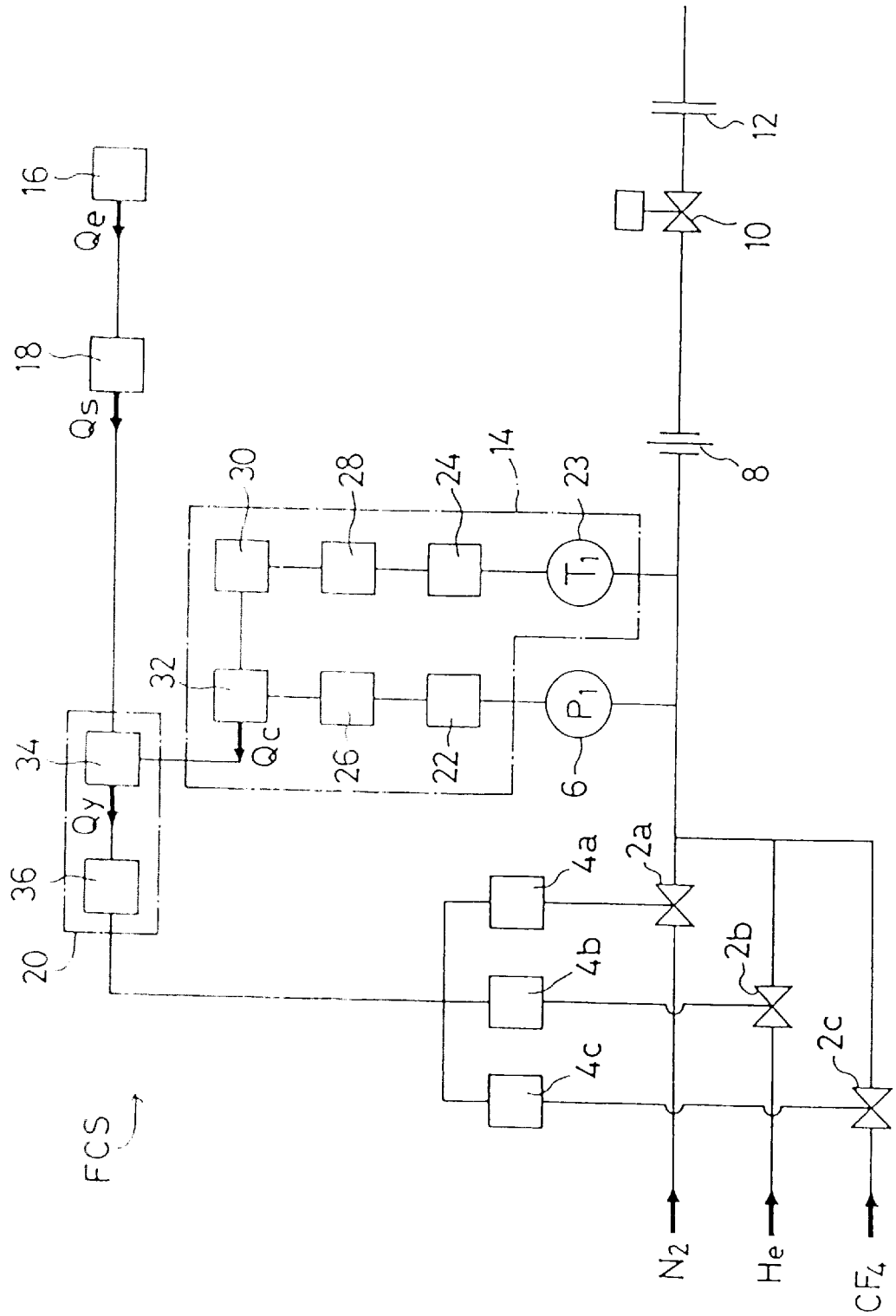
FIG. 5 is a block diagram of the fluid-switchable flow rate control system of a third embodiment.

FIG. 5 is a block diagram of the fluid-switchable flow rate control system of a third embodiment of the present invention. In FIG. 5, the parts identical with those in FIG. 2 are designated by like reference characters. And the following description is limited to the different parts. Unlike the configuration in FIG. 2, this embodiment uses three control valves 2a, 2b and 2c for $N_2$ gas, He gas and $CF_4$ gas respectively. And drives 4a, 4b and 4c are provided for those control valves.

The flow rate conversion rates to be specified by the flow rate conversion circuit 18 are switchable in three stages for $N_2$ gas, He gas, and $CF_4$ gas and are related to the flow factors FF of the respective gases as mentioned earlier. First, the flow factors of the different gases are given in Table 1. As already described, those flow factors are amounts which indicate how many times the flow rate of the gas is larger than that of $N_2$ gas under the conditions that the orifice as employed and the upstream side pressure are identical.

TABLE 1

| Gas type | Flow factor (FF) |
| --- | --- |
| $N_2$ | 1 |
| Ar | 0.888 |
| He | 2.804 |
| $CF_4$ | 0.556 |
| $C_4F_8$ | 0.344 |

FF = flow rate of gas/flow rate in terms of $N_2$ gas ($N_2$ converted flow rate)

That different gases can be controlled in flow rate with use of one orifice will be explained in detail with reference to Table 2.

TABLE 2

Orifice sizes of the fluid-switchable flow rate control system FCS, control pressure, and flow rates of $N_2$ gas Control range: 0.5 to 1.8 kgf/cm²abs; SCCM

| Orifice diameter, μm | 50 | 90 | 170 | 320 | 600 | 810 |
| --- | --- | --- | --- | --- | --- | --- |
| 0.5 | 10.0 | 34.9 | 124.8 | 442.3 | 1555.2 | 2834.5 |
| 1.8 | 38.8 | 125.9 | 449.4 | 1592.6 | 5599.0 | 10204.3 |

Control range: 200 torr (0.263 kgf/cm²abs) to 1.8 kgf/cm²abs; SCCM)

| Orifice diameter, μm | 70 | 180 | 470 | 810 |
| --- | --- | --- | --- | --- |
| 200 torr | 9.8 | 73.6 | 501.9 | 2834.5 |
| 1.8 | 76.2 | 503.9 | 3435.6 | 10204.3 |

There will now be described an example where the orifice diameter is 90 microns with reference to Table 2. It is shown that when the control pressure, that is, the upstream pressure $P_1$ is 1.8 kgf/cm²abs, the flow rate of $N_2$ gas is 125.9 SCCM. In other words, the full scale flow rate for $N_2$ gas is 125.9 SCCM, which corresponds to 100 percent of the flow rate setting signal Qe, and 5 volts in terms of the voltage value. Since the flow rate conversion rate k for $N_2$ gas is 1, the flow rate specifying signal Qs as calculated with the equation Qs=kQe is 125.9 SCCM or a full-scale 100 percent.

Now, under the same orifice and pressure conditions, He gas will be considered. In the case of He gas of 300 SCCM, 300 SCCM divided by FF for He—2.804—gives 107.0 SCCM, which is the flow rate in terms of $N_2$ gas. Since the full scale ranges for $N_2$ gas are set at 38.8, 125.9, 449.4, 1592.6, 5599.0, and 10204.3 SCCM in the present example, an orifice diameter of 90 microns for 125.9 SCCM is chosen. That is, the flow rate conversion rate k for He gas must be set at 107.0/125.9=0.850. Of course, the flow rate conversion rate in the present invention can be decided in other ways.

When the flow rate of $N_2$ gas is regulated within a range between 0 and 125.9 SCCM in FIG. 5, the flow rate conversion rate k in the flow rate conversion circuit 18 is switched to k=1, with the control valve 2a regulated via the control valve drive 4a. In this case, the control valve 2b and the control valve 2c are normally kept closed.

The other details of the operation of the fluid-switchable flow rate control system FCS as shown in FIG. 5 are the same as those in FIG. 3 and will not be described again.

Figure 6:
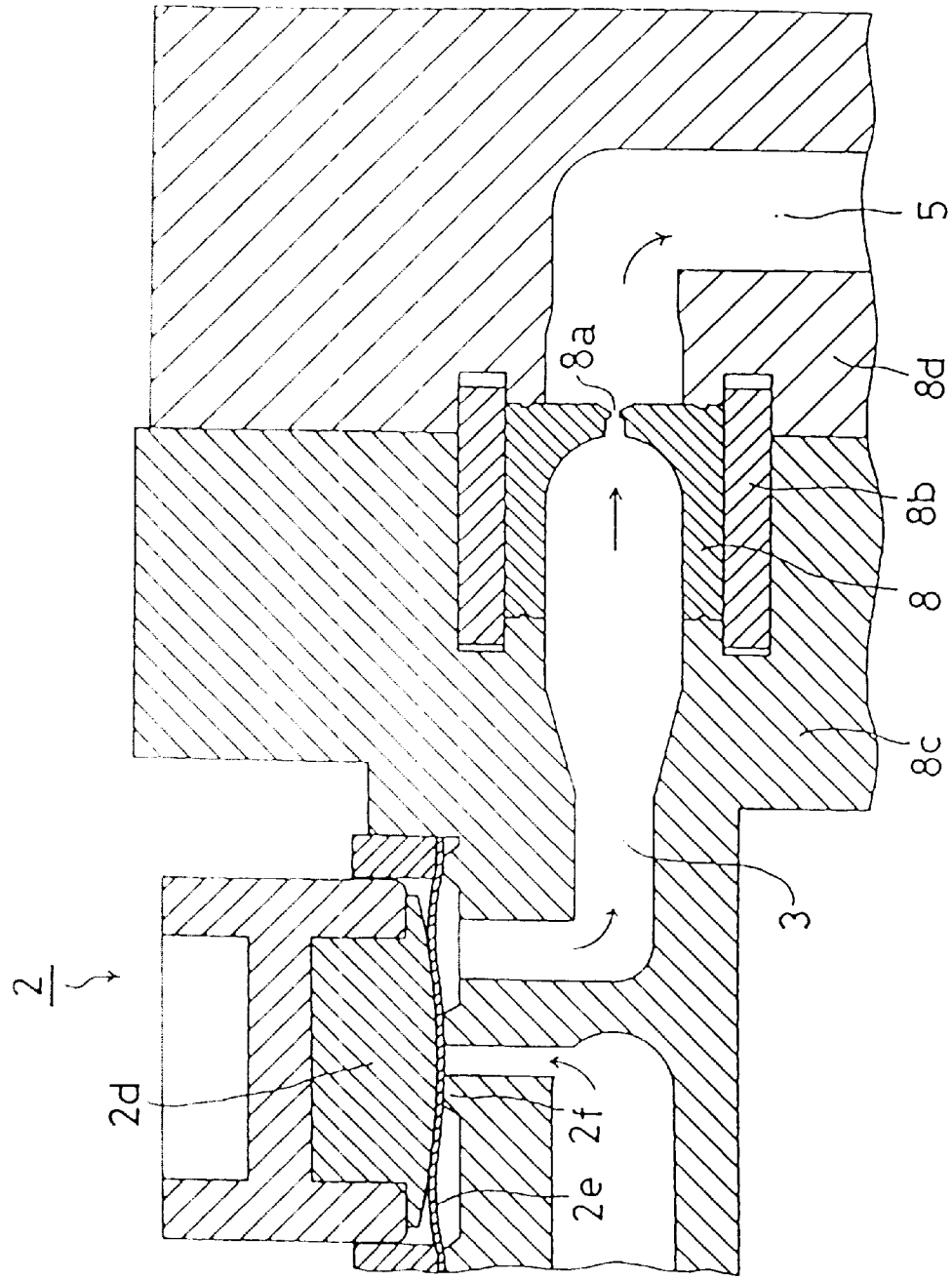
FIG. 6 is a sectional view of the core part of an installation example of the orifice member.
Figure 7:
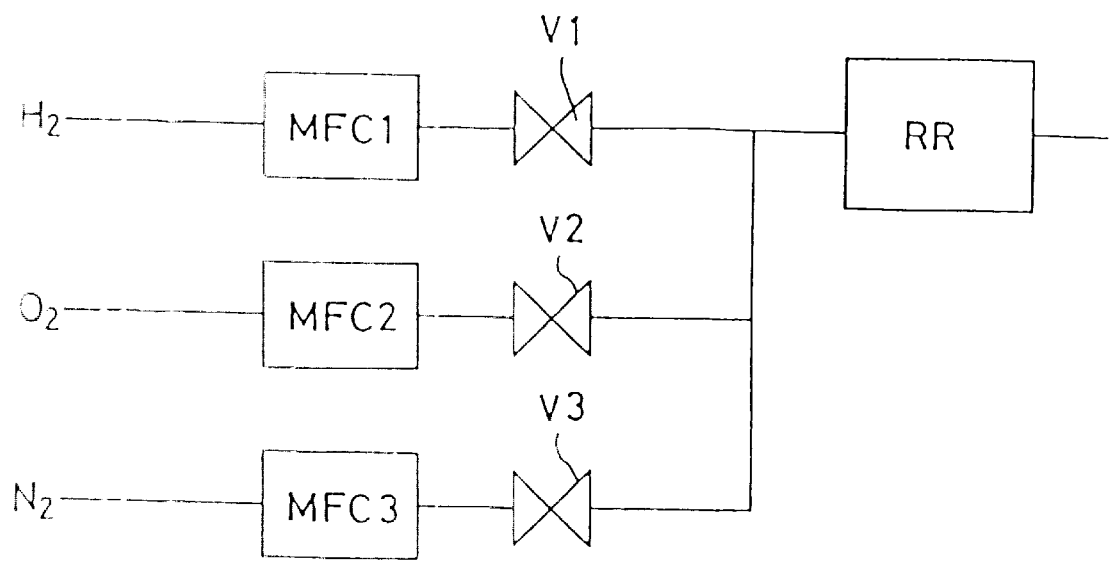
FIG. 7 is a layout of the prior art system of supplying gases to a high-purity moisture generator for the manufacture of semiconductors.

FIG. 6 is a sectional view of the core part of an installation example of the orifice 8. In FIG. 2, the numeral 2 indicates a control valve that controls the flow rate of fluid, with the diaphragm press 2d freely holding the diaphragm 2e in relation to the valve seat 2f to regulate the opening—between the diaphragm 2e and the valve seat 2f—to a desired degree. An upstream fluid passage 3 is formed in the flange 8c and a downstream fluid passage 5 is formed in the flange 8d. The orifice member 8 is removably installed with an orifice holder 8b in two flanges 8c, 8d. The orifice member 8 has an orifice bore 8a. If the two flanges 8c, 8d are disassembled, the orifice member can be dismounted and replaced with another without difficulty. By the way, this easy orifice replaceability is one of the features of the present invention.

The diaphragm press 2d is freely moved up and down by the control valve drive 4 of the piezoelectric type. If the piezoelectric element is activated to move up the diaphragm press 2d, the diaphragm 2e will move to return to the original position by elastic force, with the result that the diaphragm 2e departs from the valve seat 2f to open the valve. In addition, it is possible to freely adjust the pressure $P_1$ on the upstream side of the upstream fluid passage 3 by fine-tuning the opening. In addition to the arrangement as shown in FIG. 6, other various structures are possible that facilitate the replacement of the orifice member.

The present invention is not limited to those examples just described, but embraces variations and changes in design without departing from the spirit and scope of the present invention.

As set forth above, with the pressure $P_1$ on the upstream side of the orifice maintained at a level two or more times higher than the pressure on the downstream side of the orifice, it is possible to regulate the flow rate Qc through adjustment of the upstream pressure $P_1$ only. Flow rate Qc is calculated with the equation $Qc=KP_1$ and is automatically brought to a desired level. At the same time, the full scale flow rate can be switched to a desired value by merely inputting the flow rate setting signal in the flow rate conversion circuit. And the flow rate can be displayed and read with ease.

Another feature is that it is possible to handle a plurality of fluids by merely replacing one orifice member by another with a different orifice diameter. Furthermore, the flow rate of each fluid can be freely controlled by merely switching the flow rate conversion rate in the flow rate conversion circuit. That is, a smaller number of parts can be used to deal with a large number of kinds of fluids, which contributes to cost reduction and generalization of gas-feeding technology. Thus, a fluid-switchable flow rate control system that is very useful in industry has been provided.

What is claimed is:

1. A fluid-switchable flow rate control system which controls the flow rate of fluid with the pressure $P_1$ on the upstream side of the orifice member held about twice or more higher than the downstream pressure $P_2$, said fluid-switchable flow rate control system comprising:

an orifice member replaceable with another to provide a suitable orifice diameter according to the kind of fluid and the flow rate range, a control valve provided on the upstream side of the orifice member, a pressure detector 6 provided between the control valve and the orifice member, and a flow rate calculation circuit 14 where from the pressure $P_1$ detected by the pressure detector, the flow rate Qc is calculated with the equation $Qc=KP_1$ (K=constant), a flow rate-setting circuit for outputting flow rate setting signal Qe, a flow rate conversion circuit 18 for converting the calculated flow rate signal Qc into switch-over calculated flow rate signal Qf to change the full scale flow rate, and a calculation control circuit to output the difference between the calculated switch-over flow rate signal Qf and the flow rate setting signal Qe as control signal Qy to the drive for the control valve, thereby opening or closing the control valve to bring the control signal Qy to zero, thus controlling the flow rate on the downstream side of the orifice member.

2. The fluid-switchable flow rate control system as defined in claim 1 wherein the flow rate conversion circuit 18 is so configured that the calculated flow rate Qc is multiplied by conversion rate k into the switch-over calculated flow rate signal Qf (Qf=kQc).

3. The fluid-switchable flow rate control system as defined in claim 1 or claim 2 wherein the flow rate conversion circuit 18 is formed out of a dual in-line package (DIP) switch.

4. The fluid-switchable flow rate control system as defined in claim 1 wherein the flow rate conversion circuit is to regulate the amplification rate of an output amplifier of the pressure detector.

5. A fluid-switchable flow rate control system which controls the flow rate of fluid with the pressure $P_1$ on the upstream side of the orifice member held about twice or more higher than the downstream pressure $P_2$, said fluid-switchable flow rate control system comprising:

an orifice member replaceable with another to provide a suitable orifice diameter according to the kind of fluid and the flow rate range, a control valve provided on the upstream side of the orifice member, a pressure detector 6 provided between the control valve and the orifice member, a flow rate calculation circuit 14 where from the pressure $P_1$ detected by the pressure detector, the flow rate Qc is calculated with the equation $Qc=KP_1$ (K=constant), a flow rate-setting circuit 16 for outputting flow rate setting signal Qe, a flow rate conversion circuit 18 for converting the flow rate setting signal Qe into flow rate specifying signal Qs to change the full scale flow rate, and a calculation control circuit 20 to output the difference between the flow rate specifying signal Qs and the calculated flow rate Qc as control signal Qy to the drive for the control valve, thereby opening or closing the control valve to bring the control signal Qy to zero, thus controlling the flow rate on the downstream side of the orifice.

6. The fluid-switchable flow rate control system as defined in claim 5 wherein the flow rate conversion circuit 18 is so configured that the flow rate setting signal Qe is multiplied by conversion rate k into the switch-over calculated flow rate specifying signal Qs (Qs=kQc).

* * * * *